（12) United States Patent
Nambannor Kunnath et al.

(10) Patent No.: US 11,258,782 B2
(45) Date of Patent: Feb. 22, 2022

(54) PEER-TO-PEER NOTIFICATION SYSTEM

(71) Applicant: VMWARE, INC., Palo Alto, CA (US)

(72) Inventors: Ramanandan Nambannor Kunnath, Bengaluru (IN); Ashish Maan, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 11 days.

(21) Appl. No.: 16/805,870

(22) Filed: Mar. 2, 2020

(65) Prior Publication Data

US 2021/0211418 A1 Jul. 8, 2021

(30) Foreign Application Priority Data

Jan. 7, 2020 (IN) .............................. 202041000660

(51) Int. Cl.
*H04L 29/06* (2006.01)
*H04L 67/104* (2022.01)

(52) U.S. Cl.
CPC ........ *H04L 63/0823* (2013.01); *H04L 67/104* (2013.01)

(58) Field of Classification Search
CPC ....... H04L 67/38; H04L 67/104; H04L 67/28; H04L 67/26; H04W 4/12
USPC ............................................................ 726/4
See application file for complete search history.

(56) References Cited

U.S. PATENT DOCUMENTS

2015/0350362 A1* 12/2015 Pollack ............... H04L 67/2861
709/217
2020/0334194 A1* 10/2020 Tran ........................ G06F 16/27

* cited by examiner

*Primary Examiner* — Glenford J Madamba
(74) *Attorney, Agent, or Firm* — Clayton, McKay & Bailey, PC

(57) ABSTRACT

A first user device can receive a communication certificate associated with a user of the first user device. The communication certificate can allow the first user device to exchange certain information with a second user device that also possesses the communication certificate. The first user device can receive a notification. The first user device can also determine that a second user device associated with the user did not receive the notification. The first user device can initiate a direct connection with the second user device. The first use device can verify that the second device possesses the communication certificate. After verification, the first user device can send the notification to the second user device.

20 Claims, 4 Drawing Sheets

PEER-TO-PEER NOTIFICATION SYSTEM

RELATED APPLICATIONS

Benefit is claimed under 35 U.S.C. 119(a)-(d) to Foreign Application Serial No. 202041000660 filed in India entitled "PEER-TO-PEER NOTIFICATION SYSTEM" on Jan. 7, 2020, by VMWARE, Inc., which is herein incorporated in its entirety by reference for all purposes.

BACKGROUND

Users typically have multiple devices enrolled in a computing environment, such as an enterprise environment. For example, users can have a mobile phone, a tablet, and a personal computer. Applications of a computing environment often send notifications to enrolled user devices. For example, user devices often receive notifications for calendar events, new messages, and new emails. Except for instances where a notification is generated within the user device, these notifications originate from an external source. For example, a push notification relay server may be responsible for pushing a notification for a new email to a user device. In another example, a user can create a calendar event on one user device, and notifications for that calendar event can be distributed to other online enrolled user devices.

Existing methods do not include means for providing notifications to an offline user device. "Offline" in this sense means that the user device is not connected to a local network, such as a home router, nor to any other network such as the internet. This can create a problem for a user if the user is operating a device that is offline and misses an important notification, such as an important calendar event or email.

As a result, a need exists for a system that distributes notifications to offline devices in a computing environment.

SUMMARY

Examples described herein include systems and methods for a peer-to-peer ("P2P") notification system. The systems and methods presented herein relate to transmitting notifications to a first user device not connected to a network using a P2P connection from a second user device that is connected to a network.

An example method can include receiving, at a first user device, a communication certificate associated with a user of the first user device. Examples of a user device can include processor-based devices, such as a personal computer, tablet, or cell phone. The communication certificate can be associated with a user profile and may allow the first user device to transmit certain information directly to a second device that is also in possession of the communication certificate. The communication certificate can be received from a server, as an example, such as an enterprise management server. For example, the management server can provide the communication certificate to the first user device as part of an enrollment process.

The method can include receiving a notification at the first user device. A notification can be, for example, a push notification associated with an application on the user device, such as a new email or message. The first user device can receive the notification from the management server or from another server that sends the notification on behalf of the management server, such as based on instructions from the management server. Receiving the notification can also include receiving an indication that a second user device associated with the user did not receive the notification. For example, the server can indicate to the first user device that the server failed to connect to the second user device and therefore could not deliver the notification. Such a failure can occur if, for example, the second user device is offline or not connected to the server's network. In another example, the server can place the notification in a notification queue. The server can periodically sync the notification queue with all enrolled user devices associated with the user. The enrolled user devices may provide a notification receipt confirmation during the sync process. The first user device can determine that a second user device did not receive the notification because the second user device did not provide a receipt confirmation.

The method can also include initiating a direct connection with the second user device. An example of a direct connection can include a P2P connection. Initiating a direct connection can include sending a connection request to the second user device via wireless communication methods such as WI-FI or BLUETOOTH.

The method can include verifying that the second user device is authorized to receive the notification. An example verification can include confirming that the second user device is in possession of the communication certificate. As an example, a server can provide a communication certificate to multiple user devices associated with a user. For example, a user can enroll multiple devices by providing credentials associated with the user from the devices. The server may provide a communication certificate to each of the enrolled devices. The communication certificate can allow user devices that possess a communication certificate associated with the name user to exchange certain information, such as notifications. In some examples, the authorization based on communication certificates is performed by an application installed on the relevant devices.

After the verification, the method can include transmitting the notification to the second device. For example, the first user device can establish a direct connection to the second user device, verify that the second device possesses the communication certificate associated with the user, and then transmit the notification to the second user device. In an example that includes a notification queue, the first user device can provide a notification receipt confirmation for the second device. For example, the first device can send the notification receipt confirmation when the devices associated with the user sync with each other. This can include syncing the notification queue and sending the notification receipt confirmation to additional user devices associated with the user. For example, the first user device can sync the notification queue with all user devices online that possess the communication certificate. In a notification queue example, the first user device can also clear the notification from the queue. For example, after receiving the notification receipt confirmation from the second user device, the first user device can check to see if all other user devices associated with the user have provided a notification receipt confirmation. If so, the first user device can clear the notification from the notification queue.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

A first user device can receive a communication certificate associated with a user of the first user device. The communication certificate can allow the first user device to exchange certain information with a second user device that also possesses the communication certificate. The communication certificate can be received from a management server. The first user device can receive a notification. The first user device can also determine that a second user device associated with the user did not receive the notification. The first user device can initiate a direct connection with the second user device. The first use device can verify that the second device possesses the communication certificate. After verification, the first user device can send the notification to the second user device. The first user device can also notify the management server that the second user device received the notification.

Figure 1:
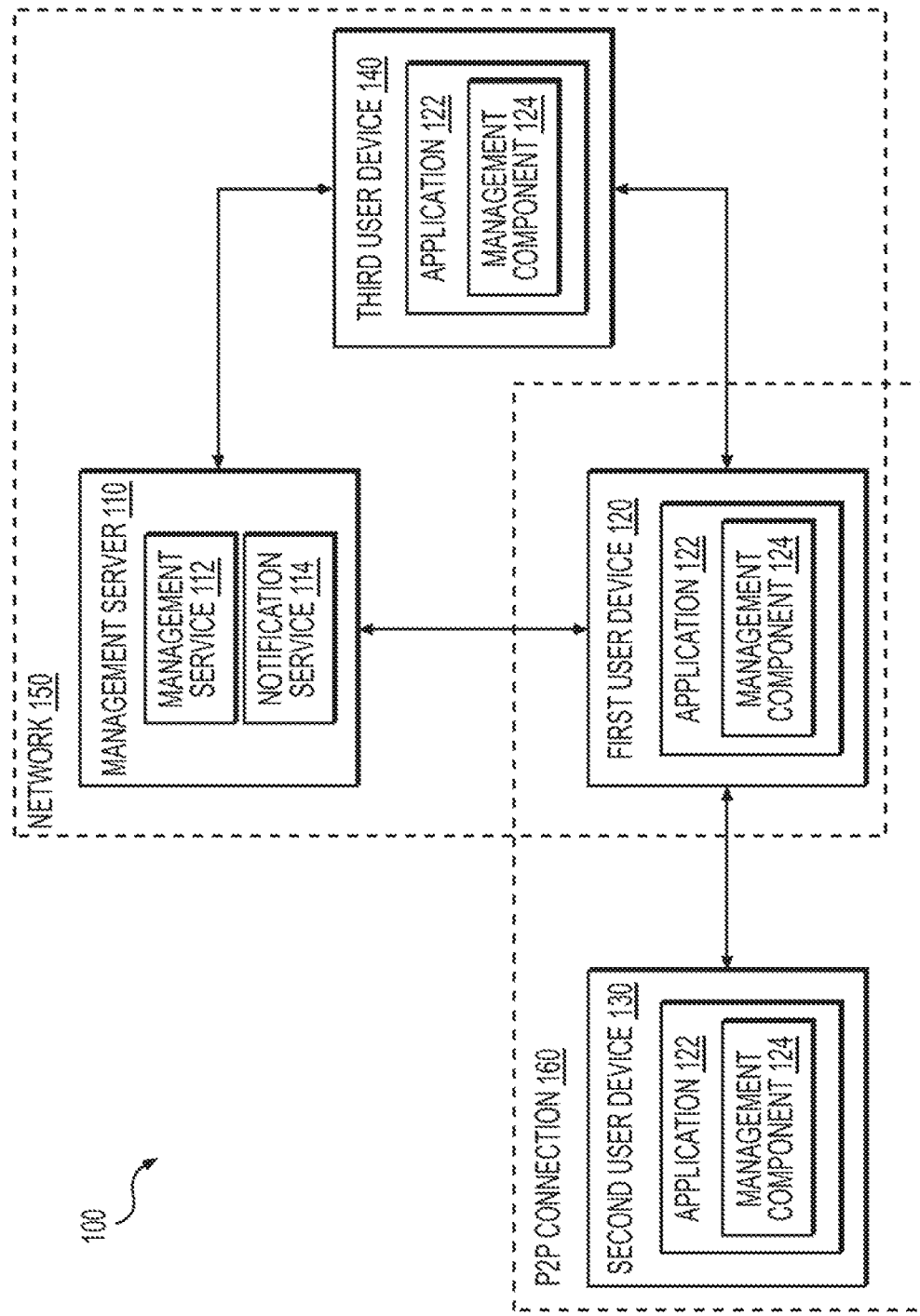
FIG. 1 is an illustration of a system for distributing notifications to offline devices.

FIG. 1 is an illustration of enterprise environment 100 wherein notifications can be distributed to offline devices. Although references are made herein to an enterprise environment and enterprise resources, those references are merely used as examples and are not intended to be limiting in any way. For example, enterprise environment 100 can encompass any system in which notifications can be distributed from an online user device directly to an offline user device, such as any system that includes a network and a P2P connection with a device not connected to that network. Enterprise environment 100 can be a computing environment that includes multiple user devices associated with a user profile. For example, enterprise environment 100 can include management server 110, first user device 120, second user device 130, and third user device 140. Management server 110 can be one or more servers configured to manage the operation of user devices that operate within a computing environment. Examples of a user device can include processor-based devices, such as a personal computer, tablet, or cell phone. Management server 110 and user devices 120, 130, and 140 can all operate within with enterprise environment 100 with an active connection to network 150. For example, in enterprise environment 100 as depicted in FIG. 1, first user device 120 and third user device 140 have an active connection to network 150 and can operate within enterprise environment 100, but second user device 130 cannot operate within enterprise environment 100 because it does not have an active connection to network 150. If second user device 130 connects to network 150, then second user device 120 could then operate within enterprise environment 100.

Management server 110 can include management service 112 that can manage user device access to enterprise resources, such as applications, email, calendar data, documents, and contact information. In an example, management service 112 can verify that a user device is compliant with applicable compliance rules according to regulations set by a network administrator prior to granting a user device access to enterprise resources. Management server 110 can also include notification service 114 that manages the distribution of notifications to user devices.

Each of user devices 120, 130, and 140 can include portal application 122. Portal application 112 can be, for example, an application that provides varying levels of access to multiple other applications that may or may not be installed on the user device. Portal application 122 can store a user's credentials and provide access to enterprise applications by authenticating the user to the applications. For example, portal application 122 can utilize single sign-on ("SSO") services to provide access to the applications.

Some enterprise environments can require enrollment with a management system in order to access enterprise resources. In an example, portal application 122 can include management component 124 that can assist in the enrollment process by communicating with management service 112—such as by exchanging tokens—obviating the need to download a management-dedicated application, such as an agent application. After enrolling the user device with the management service 112 through portal application 122, management service 112 can provide portal application 122 with an authorization certificate or token ("authorization certificate"). In some examples, when portal application 112 requests access to enterprise resources from management server 110, portal application 112 can provide the authorization certificate, which verifies that the user device is authorized to access the enterprise resources.

Management service 112 can also provide a communication certificate to the user device. The communication certificate can be associated with a specific user profile and can allow user devices to exchange certain information associated with the user profile with each other. The communication certificate can be stored at the user device in a location accessible to, for example, portal application 122. A communication certificate can be used to verify that a first user device is a trusted device that is authorized to send information to, or receive certain from, a second user device. If both devices are in possession of the communication certificate associated with the user, then they can be authorized to exchange information specific to the user through a direct connection. The communication certificate can be the same as the authorization certificate or it can be a separate certificate. Management service 112 can provide the communication certificate during the enrollment process in some examples and after the enrollment process in other examples.

In an example, user devices 120 and 130 are enrolled devices that possess a communication certificate associated with a user profile. As shown in FIG. 1, first user device 120 is actively connected to management server 110 through network 150, but second user device 130 is not. In some examples, system 100 can also include third user device 140 that is also part of, or connected to, network 150. In an example, all of user devices 120, 130, and 140 are associated with a user profile corresponding to the same user. In another example, all of user devices 120, 130, and 140 possess an authorization certificate associated with a user profile, and at least user devices 120 and 130 possess a communication certificate associated with the user profile. When first user device 120 needs to connect to second user device 130, first user device 120 establishes P2P connection 160 with second user device 130. First user device 120 requests the communication certificate from second user device 130 to verify that second user device 130 is authorized to exchange enterprise resources via a P2P connection. Second user device 130 provides the communication certificate, and first user device 120 then knows that second user device 130 is authorized to receive enterprise resources associated with the user profile.

Various situations could arise in which first user device 120 may need to establish a P2P connection with second user device 130. For example, management server 110 may receive a notification to be pushed to all the user devices, but second user device 120 is offline and therefore unable to receive the notification from management server 110. If the user is using second user device 130 while it is offline, then the user may not become aware of the notification. If management server 110 is unable to send the notification to second user device 130, then that may trigger first user device 120 to establish a P2P connection 160 with second user device 130 and send the notification. Such a notification transfer is discussed in more detail later herein regarding FIGS. 2-4.

P2P connection 160 can include any type of direct connection that links user devices. P2P connection 160 can be wireless or wired. Examples of P2P connection 160 can include a direct WIFI or BLUETOOTH connection. In some examples, P2P connection 160 can connect first user device 120 and second user device 130 via the internet. In such examples, second user device 130 would have an active internet connection but may not be able to connect to management server 110 to receive the notification. In an example, portal application 122 can cause first user device 120 to initiate P2P connection 160. Portal application 122 can also manage credential and data file exchanges between the user devices as well as determine when to terminate P2P connection 160. For example, portal application 122 may instruct the user devices to terminate P2P connection 160 after second user device 130 send a notification receipt confirmation to first user device 120.

Enrolling a user device with management server 110 can establish control over the user device. For example, management server 110 can send policies to the portal application 122. Those policies can provide restrictions or other requirements for the user device, including remedial actions for when those restrictions or requirements are not met. Similarly, portal application 122 can receive and enforce compliance rules sent by management server 110. If a compliance rule is broken, portal application 122 can take remedial action as instructed by management server 110. For example, portal application 122 can revoke an authorization certificate so that the user device can no longer access enterprise resources.

Figure 2:
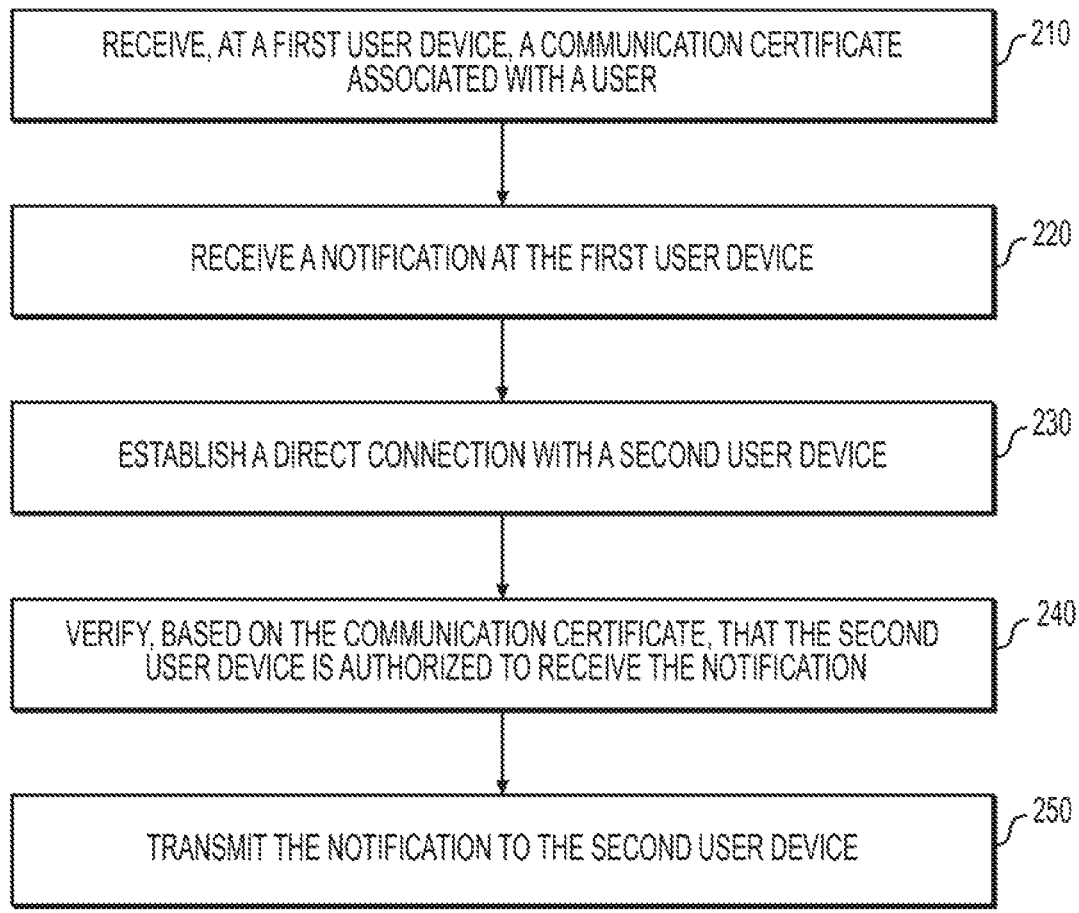
FIG. 2 is a flowchart of an example method for distributing notifications to offline devices.

FIG. 2 is a flowchart of an example method for distributing notifications to offline devices. At stage 210, first user device 120 can receive a communication certificate associated with a user profile. The communication certificate can be provided to other user devices to verify that the device is authorized to receive enterprise resources associated with the user profile and notifications associated with enterprise resources or applications. The communication certificate can be provided to first user device 120 and can be stored at a storage location accessible to portal application 122 that executes on the device. In an example, multiple user devices associated with the user profile, such as user devices 120, 130, and 140, can receive a communication certificate, and the communication certificate can be used by the devices to authenticate each for the purpose of establishing a P2P connection over which information can be exchanged. In an example, first user device 120 includes portal application 122 that can interact with management server 110. First user device 120 receives the communication certificate from management server 110 and portal application 122 stores the communication certificate for later use.

At stage 220, first user device 120 can receive a notification. A notification can be, for example, a push notification associated with an application on first user device 120, such as a new email or message. For example, portal application 122, interacting with management server 110, can receive a notification associated with an application or enterprise resources associated with the user profile. The notification can be a push notification, for example. The notification can also be generated by first user device 120 itself. For example, first user device 120 can include an application that generates notifications without the need to communicate with a server, such as a calendar application. A calendar application installed on a user device can generate a notification to remind a user of events in the calendar. In some examples, the notification can be delivered by a dedicated notification delivery service that is separate from management server 110. In some examples, the notification can be generated by a server associated with an application executing on first user device 120.

In an example, notifications can be synced across multiple user devices, such as user devices 120, 130, and 140. The user devices can include a centralized application, such as portal application 122 described herein, that manages notification syncing. The portal applications 122 of each respective device can communicate with each other and sync a notification queue at regular intervals, for example. The portal applications 122 can sync with each through a centralized network in one example, and in another example the devices can sync using P2P network 160 created by the devices. In P2P network 160, the user devices can communicate with each other without the need for a centralized server.

In some examples, management server 110 or the user devices can add the notification to a notification queue. A notification queue can be stored on one or multiple devices. In an example, the notification queue is stored on management server 110. In another example, each user device and management server 110 all include a notification queue that can be synced with the notification queue of other devices. The notification queue can be synced across all devices associated with the user profile using the methods previously described. Syncing a notification queue can include exchanging data files relating to notifications using, as an example, an application programming interface ("API") call. The data files can be XML or JSON files, for example. This can also be done using a dedicated interface. When all enrolled user devices have received the notification, the notification can be removed from the queue. Portal application 122 can maintain a list of enrolled devices to ensure that the notification queue is maintained until all of the user's enrolled devices have received the notification.

Receiving a notification can also include a receipt confirmation feature. For example, once a user device receives a notification, it can provide a receipt confirmation. A receipt confirmation can inform one or more of the user's other enrolled devices that it received the notification. In an example that includes a notification queue, a notification may remain in the queue until all user devices have provided a receipt confirmation. As an example, management server 110 can receive a push notification for an application associated with a user profile. Management server 110 can add the push notification to the notification queue. Management server 110 can periodically sync the notification queue with all devices enrolled with the user profile. In some examples, management server 110 can store the notification queue and provide the user devices with information in the notification queue when necessary. In another example, the user devices can also include an instance of the notification queue that updates when a sync occurs. When the next sync occurs, all enrolled user devices that are online can receive the notification. The user devices can respond with a receipt confirmation that also syncs with all the online user devices. The notification can remain in the notification queue until all enrolled devices have responded with a receipt confirmation.

At stage 230, first user device 120 can initiate a direct connection with second user device 130. Examples of a direct connection can include WIFI or BLUETOOTH. A direct connection can also include a P2P connection that may include a network but does not require a centralized server. Second user device 130 can be configured to receive a direct connection request, even when second user device 130 is offline. Portal application 122, as an example, can cause second user device 130 to be discoverable to other user devices executing portal application 122 and being associated with the same user. For example, even when second user device 130 is offline, portal application 122 can cause second user device 130 to be discoverable via BLUETOOTH or a hidden service set identifier ("SSID") only known to the user's other user devices with portal application 122 installed.

In an example, first user device 120 can broadcast a connection request using predetermined parameters known by both user devices. In one example, first user device 120 can send a connection request via BLUETOOTH using a pin or password known only to the second device. In another example, the first device can attempt to connect to second user device 130 using an SSID associated with second user device 130. Such a request may be encrypted so that only first user device 120 and second user device 130 can read the request. For example, the request can be encrypted with a public key that requires a private key pair to decrypt, and both user devices can store the private key locally on each device.

Initiating a direct connection can include determining that second user device 130 did not receive the notification. In an example, after establishing a P2P connection, first user device 120 can check notification receipt confirmations and determine that second user device 130 did not provide such a confirmation. In another example, after establishing the P2P connection, first user device 120 can determine that second user device 130 did not sync with a notification queue or otherwise receive a notification, and may therefore be offline.

At stage 240, first user device 120 can verify, based on the communication certificate, that second user device 130 is authorized to receive the notification. The verification can occur after, or as a part of, the direct connection initiation of stage 230. The verification can include ensuring that second user device 130 possesses a communication certificate associated with the user profile. In an example, second user device 130 can send a data file to first user device 120 that includes a copy of the communication certificate that second user device 130 possesses. First user device 120 can compare that communication certificate to the communication certificate in its own possession to verify that they match.

In some examples, second user device 130 can encrypt the communication certificate for security reasons. For example, second user device 130 can use a security key to encrypt the communication certificate. In some examples, second user device 130 can provide a hash function of the communication certificate, such as a cryptographic hash function. Because hash functions are extremely difficult to reverse engineer, providing a hash function of the communication certificate can help safeguard the communication certificate if intercepted. Only devices in possession of a hash value associated with the hash function can decipher the original message. In an example, first user device 120 can use such a hash value to decipher the hash function provided by second user device 130 and compare it to the communication certificate stored on first user device 120. A match indicates to first user device 120 that second user device 130 possesses the communication certificate and is authorized to receive the notification.

Compliance and security standards are subject to change, and enterprises often provide regular security updates to user devices. An enterprise may require that user devices possess up-to-date compliance and security updates to have access to enterprise resources. Because of this, first user device 120 can also verify that the communication certificate of second user device 130 is not expired or that second user device 130 currently meets all required compliance and security standards. If second user device 130 is not in possession of a current communication certificate or does not meet the required compliance or security standards, then first user device 120 can, for example, refrain from sending any information to second user device 130. First user device 120 can also communicate the compliance and security status of second user device 130 to management server 110. In an example, first user device 120 can generate a notification that informs a user that second user device 130 requires an update before accessing enterprise resources. This notification can be synced with other user devices and management server 110 as well.

At stage 250, first user device 120 can transmit the notification to second user device 130. In an example, first user device 120 can transmit the notification to second user device 130 in response to first user device 120 verifying that second user device 130 is authorized to receive the notification. This stage can also include receiving a notification receipt confirmation from second user device 130. In an example, upon receiving the notification receipt confirmation, first user device 120 can update the notification queue. This can include clearing the notification from the queue if first user device 120 determines that all other user devices associated with the user profile have received the notification. Any other user devices associated with the profile as well as management server 110 can receive the notification queue update with the next device sync, in an example.

Figure 3:
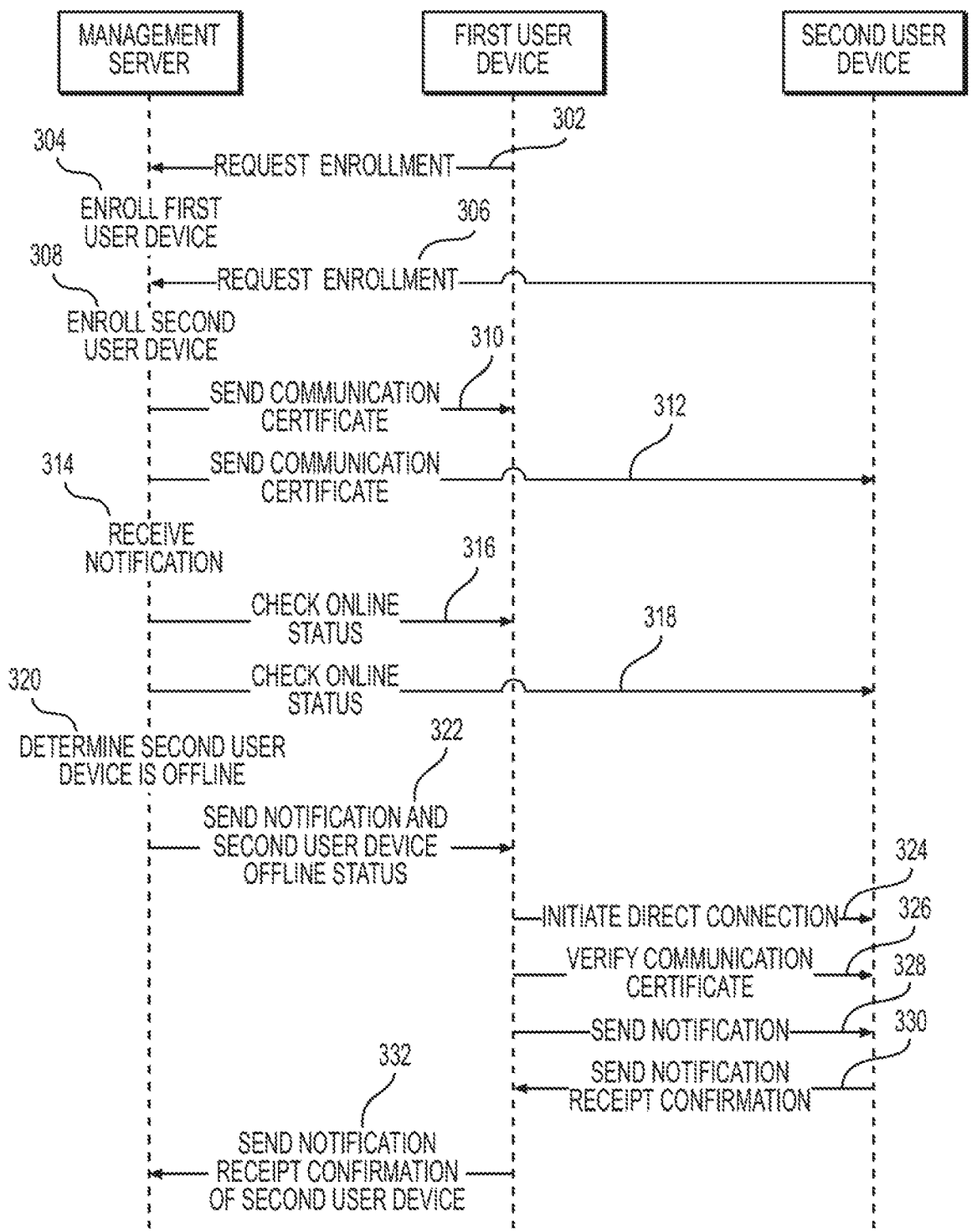
FIG. 3 is a sequence diagram of an example method for distributing notifications to offline devices.

FIG. 3 is an example sequence diagram for distributing notifications to offline devices that includes management server 110, first user device 120, and second user device 130. Management server 110 can be one or more servers configured to manage the operation of user devices that operate within a computing environment, such as an enterprise. The user devices can be processor-based devices designed for use by a user, such as a personal computer, tablet, or cell phone.

The first and second user devices can communicate with management server 110 to enroll in the enterprise environment. At stage 302, first user device 120 can request enrollment. Enrollment can include, as an example, an exchange of information between management server 110 and first user device 120 that associates first user device 120 with a user profile within the enterprise environment. If the associated user profile does not yet exist in the enterprise—for example, because this is the first device enrolled by that particular user-then enrollment can include management server 110 creating the user profile. For example, management server 110 can request a user ID and authentication password or token that can be used to provide access to first user device 120, as well as any other user devices associated with the user profile, to the enterprise network and resources. In an example, management server 110 may also require additional authentication to verify that a new user is authorized to create a user profile, such as an additional one-time token or password provided by a system administrator. Upon authenticating first user device 120, management server 110 can create the user profile.

After creating the user profile, or if the user profile already exists and first user device 120 provided the current authentication credentials, at stage 304 management server 110 can enroll first user device 120 in the enterprise environment. Enrolling first user device 120 can include providing first user device 120 with a token or certificate for authentication. Enrollment can also include installing management software on first user device 120. The management software can be a standalone application, such as a management agent, or it can be an application that includes management functionality. Management server 110 can provision the application directly to first user device 120 in one example. In another example, management server 110 can direct first user device 120 to download the application from an application repository or other location. In an example, the application acquired by first user device 120 can be portal application 122. Portal application 122 can store the authenticating token or certificate. Management server 110 can interact directly with portal application 122 for authenticating user devices and managing enterprise resource exchange.

The management software installed on behalf of management server 110, such as portal application 122, can perform compliance checking on first user device 120. The compliance check can be part of the enrollment process in one example. For example, portal application 122 can gather information about the device, such as the device type, operating system type and version, physical location, a list of applications installed on the device, and any other relevant information. This information can be provided to management server 110 as part of enrollment, to ensure that the device is not compromised in some way before providing it with access to enterprise resources.

At stage 306, second user device 130 can request enrollment. In an example, a user interacting with second user device 130 can request that management service 112 associate second user device 130 with the same user profile as first user device 120. The user can also provide authentication credentials or tokens associated with first user device 120. In one example, the user can provide the same user ID and password associated with the user profile. In another example, management server 110 can provide a password or token to first user device 120, which is already enrolled and authenticated, which the user can input into the second device to authenticate it. The authentication methods discussed herein are merely examples, and there are numerous authentication methods that can be implemented in enrolling user devices.

After authentication, at stage 308, management server 110 can enroll second user device 130. Enrolling second user device 130 can be similar to stage 304 where management server 110 also provides second user device 130 with an authentication certificate or token. Management server 110 can also inform any other user devices associated with the user profile, including first user device 120, that second user device 130 is now enrolled. In an example, management server 110 can update all user devices associated with the user profile any time that a new user device is added or a user device is removed. As discussed with respect to first user device 120, enrollment of second user device 130 can include installation of management software. In some examples, the first and second user devices have the same portal application 122 installed on each device. The portal applications 122 can access updated user profiles sent to the device by management server 110.

At stages 310 and 312, management server 110 can provide a communication certificate to the first and second user devices, respectively. A communication certificate can be associated with the user profile and can allow user devices associated with the same user profile to exchange certain information with each other. Management server 110 can provide the communication certificates as part of the enrollment process or it can provide them after enrollment. For example, management server 110 can provide the communication certificates in response to a user requesting to enable offline notification access through portal application 122. Portal application 122, in response to the user selecting that option, can send a request to management server 110 for the communication certificates.

In an example, the communication certificates are management by portal application 122. Portal application 122 can monitor the user devices to ensure that they remain compliant and meet security standards. If a user device is not compliant or does not meet the security standards, portal application 122 can make the communication certificate unusable for that user device so that the user device cannot exchange enterprise information or resources with other user devices. For example, management server 110 can revoke the communication certificate by sending an appropriate instruction to portal applications 122 of each online device.

At stage 314, management server 110 can receive a notification, such as a push notification associated with an application on the user device. Some examples of notifications can include a new email or message, a system notification from an administrator, or a calendar event. Management server 110 can receive a notification from a notification relay server or an enterprise system administrator device, for example. Receiving a notification can also include management server 110 generating a notification, including by instructing a notification relay server to forward or generate a notification to the user devices.

The notification can also originate from the first or second user device. For example, first user device 120 can include an application that generates a notification, such as a notification for a calendar event generated from a calendar application on first user device 120. In an example, the user profile includes an email account, and the first and second user devices have an email client application configured to the email account. Management server 110 receives an indication of a new email sent to the address associated with the email account. The new email may originate from an email exchange server, as an example.

At stages 316 and 318, management server 110 can check the online status of the first and second user devices respectively. This can also occur before the notification is generated or received at stage 314. In an example, management server 110 and the user devices can utilize a heartbeat protocol. A heartbeat is a signal generated periodically that indicates the health and availability of a device. A heartbeat protocol allows management server 110 to remain up to date on whether a user device can receive an incoming notification. In one example, upon generating a notification, management server 110 can ping the first and second user devices to determine their availability for receiving the notification. In some examples, the heartbeat signal is sent from portal application 122 or other management software executing on each user device.

At stage 320, management server 110 can determine that second user device 130 is offline. Management server 110 can make this determination using the heartbeat protocol or by pinging second user device 130, for example. Management server 110 can determine that second user device 130 is offline if second user 130 device does not respond within a predetermined amount of time. In another example, management server 110 can determine that second user device 130 is offline if it attempts to send the notification to second user device 130 and is unable to do so, or second user device 130 fails to provide a notification receipt confirmation. If second user device 130 is offline, then management server 110 cannot send the notification to second user device 130. This stage can also include determining that second user device 130 is offline and therefore unable to receive a notification from a different source, such as a notification server.

At stage 322, management server 110 can send the notification to first user device 120. Management server 110 can also indicate to first user device 120 that second user device 130 is offline and cannot receive the notification. In some examples, stage 322 includes sending an offline indication to first user device 120 without sending a notification. In one example, management server 110 can also send instructions to first user device 120 to initiate a direct connection with second user device 130. In another example, first user device 120 can be configured to initiate a direct connection with second user device 130 upon receiving a notification determining that second user device 130 is offline and cannot receive it. For example, portal application 122 on first user device 120 can manage such situations.

At stage 324, first user device 120 can initiate a direct connection with second user device 130. In an example, second user device 130 can be configured to accept connection requests from certain other devices, such as a user device with the communication certificate. Portal application 122 can provide such a configuration, as an example. Portal application 122 can provide functionality that causes second user device 130 to be discoverable to other user devices with a similar portal application 122 that possess the communication certificate. For example, portal application 122 can cause second user device 130 to be discoverable via BLUETOOTH or a hidden WIFI SSID known to other user devices with the communication certificate. In some examples, portal application 122 makes a device discoverable to other devices without the communication certificate, but a connection between those devices can require the certificates.

At stage 326, first user device 120 can verify that second user device 130 possesses the communication certificate. The communication certificate can be specific to the user profile. Verifying the communication certificate can include comparing second user device 130's communication certificate to that of first user device 120 to ensure that they match. In some examples, second user device 130 can encrypt the communication certificate for security reasons. For example, second user device 130 can use a security key to encrypt the communication certificate. In some examples, second user device 130 can provide a hash function of the communication certificate, such as a cryptographic hash function. First user device 120 can use a hash value to decipher the hash function provided by second user device 130 and compare it to the communication certificate stored on first user device 120. A match indicates to first user device 120 that second user device 130 possesses the communication certificate and is authorized to receive the notification.

First user device 120 can also verify that second user device 130's communication certificate is not expired or invalid. A current and valid communication certificate can indicate to first user device 120 that second user device 130 is authorized to receive the notification. Sometimes notifications contain sensitive information, and verifying the communication certificate can help prevent such information from being sent to a user who should not have access to such information.

At stage 328, after verifying that second user device 130 possesses the communication certificate, first user device 120 can send the notification to second user device 130. In an example, first user device 120 can encrypt the notification to provide additional security. The communication certificate can allow second user device 130 to decrypt the notification, such as by using the communication certificate or a different private key shared across devices for decryption. At stage 330, second user device 130 can send a notification receipt confirmation to first user device 120. A notification receipt confirmation can simply be a message informing first user device 120 that second user device 130 received the notification. At stage 332, first user device 120 can relay the receipt confirmation to management server 110 so that management server 110 knows that all user devices associated with the user profile have received the notification. In some examples, second user device 130 sends the notification receipt confirmation to both first user device 120 and management server 110 together.

Figure 4:
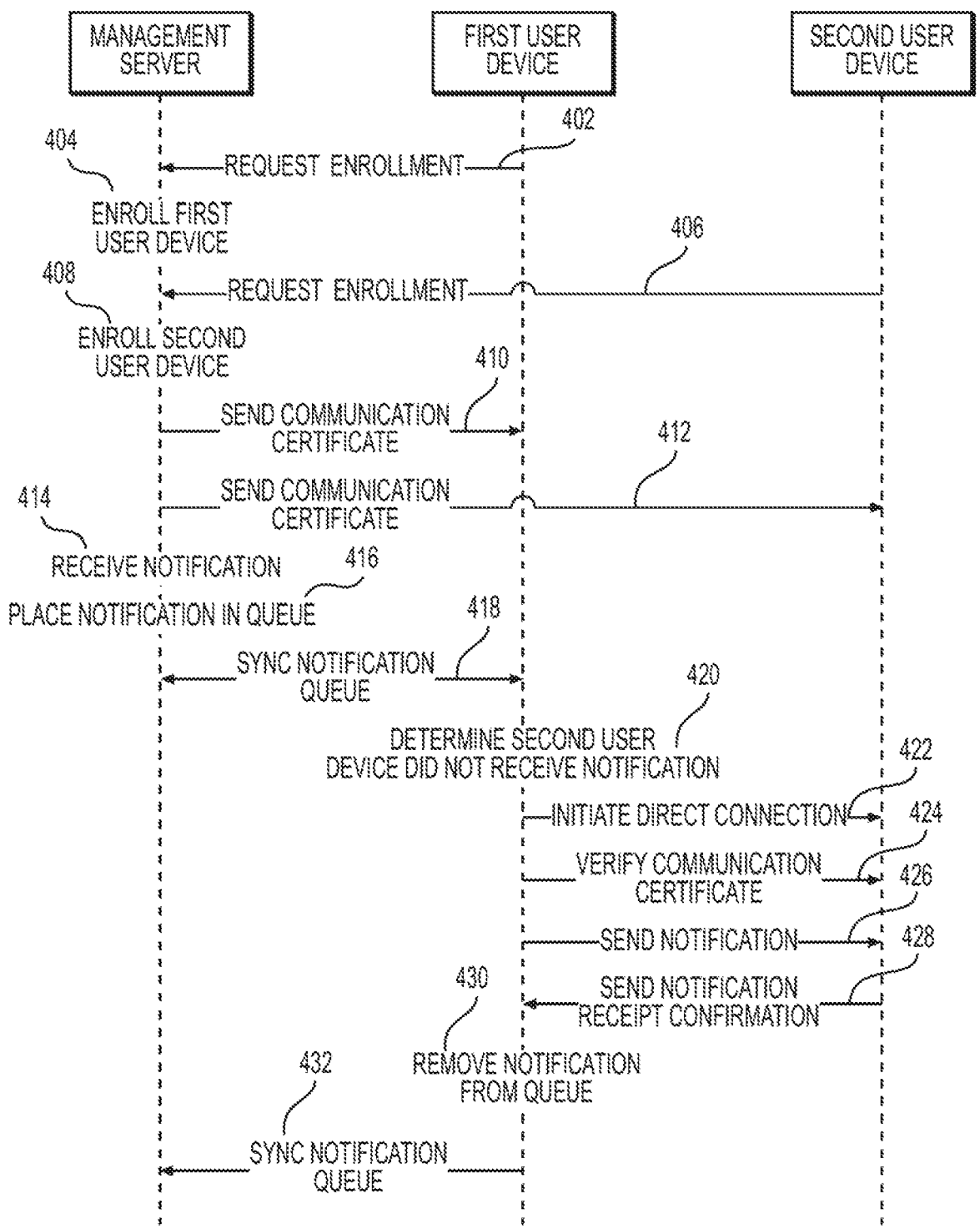
FIG. 4 is a sequence diagram of a second example method for distributing notifications to offline devices.

FIG. 4 is a sequence diagram for another example method of distributing notifications to offline devices that includes management server 110, first user device 120, and second user device 130. Management server 110 can be one or more servers configured to manage the operation of user devices that operate within a computing environment, such as an enterprise. The user devices can be processor-based devices designed for use by a user, such as a personal computer, tablet, or cell phone.

The first and second user devices can communicate with management server 110 to enroll in the enterprise environment. At stage 402, first user device 120 can request enrollment. Enrollment can include, as an example, an exchange of information between management server 110 and first user device 120 that associates first user device 120 with a user profile within the enterprise environment. If the associated user profile does not yet exist in the enterprise enterprise—for example, because this is the first device enrolled by that particular user—then enrollment can include management server 110 creating the user profile. For example, management server 110 can request a user ID and authentication password or token that can be used to provide access to first user device 120, as well as any other user devices associated with the user profile, to the enterprise network and resources. In an example, management server 110 may also require additional authentication to verify that a new user is authorized to create a user profile, such as an additional one-time token or password provided by a system administrator. Upon authenticating first user device 120, management server 110 can create the user profile.

After creating the user profile, or if the user profile already exists and first user device 120 provided the current authentication credentials, at stage 404 management server 110 can enroll first user device 120 in the enterprise environment. Enrolling first user device 120 can include providing first user device 120 with a token or certificate for authentication. Enrollment can also include installing management software on first user device 120. The management software can be a standalone application, such as a management agent, or it can be an application that includes management functionality. Management server 110 can provision the application directly to first user device 120 in one example. In another example, management server 110 can direct first user device 120 to download the application from an application repository or other location. In an example, the application acquired by first user device 120 can be portal application 122. Portal application 122 can store the authenticating token or certificate. Management server 110 can interact directly with portal application 122 for authenticating user devices and managing enterprise resource exchange.

The management software installed on behalf of management server 110, such as portal application 122, can perform compliance checking on first user device 120. The compliance check can be part of the enrollment process in one example. For example, portal application 122 can gather information about the device, such as the device type, operating system type and version, physical location, a list of applications installed on the device, and any other relevant information. This information can be provided to management server 110 as part of enrollment, to ensure that the device is not compromised in some way before providing it with access to enterprise resources.

At stage 406, second user device 130 can request enrollment. In an example, a user interacting with second user device 130 can request that management service 112 associate second user device 130 with the same user profile as first user device 120. The user can also provide authentication credentials or tokens associated with first user device 120. In one example, the user can provide the same user ID and password associated with the user profile. In another example, management server 110 can provide a password or token to first user device 120, which is already enrolled and authenticated, which the user can input into the second device to authenticate it. The authentication methods discussed herein are merely examples, and there are numerous authentication methods that can be implemented in enrolling user devices.

After authentication, at stage 408, management server 110 can enroll second user device 130. Enrolling second user device 130 can be similar to stage 404 where management server 110 also provides second user device 130 with an authentication certificate or token. Management server 110 can also inform any other user devices associated with the user profile, including first user device 120, that second user device 130 is now enrolled. In an example, management server 110 can update all user devices associated with the user profile any time that a new user device is added or a user device is removed. As discussed with respect to first user device 120, enrollment of second user device 130 can include installation of management software. In some examples, the first and second user devices have the same portal application 122 installed on each device. The portal applications 122 can access updated user profiles sent to the device by management server 110.

At stages 410 and 412, management server 110 can provide a communication certificate to the first a second user devices respectively. A communication certificate can be associated with the user profile and can allow user devices associated with the same user profile to exchange certain information with each other. Management server 110 can provide the communication certificates as part of the enrollment process or it can provide them after enrollment. For example, management server 110 can provide the communication certificates in response to a user requesting to enable offline notification access through portal application 122. Portal application 122, in response to the user selecting that option, can send a request to management server 110 for the communication certificates.

In an example, the communication certificates are management by portal application 122. Portal application 122 can monitor the user devices to ensure that they remain compliant and meet security standards. If a user device is not compliant or does not meet the security standards, portal application 122 can make the communication certificate unusable for that user device so that the user device cannot exchange enterprise information or resources with other user devices. For example, management server 110 can revoke the communication certificate by sending an appropriate instruction to portal applications 122 of each online device.

At stage 414, management server 110 can receive a notification, such as a push notification associated with an application on the user device. Some examples of notifications can include a new email or message, a system notification from an administrator, or a calendar event. Management server 110 can receive a notification from a notification relay server or an enterprise system administrator device, for example. Receiving a notification can also include management server 110 generating a notification, including by instructing a notification relay server to forward or generate a notification to the user devices. The notification can also originate from the first or second user device. For example, first user device 120 can include an application that generates a notification, such as a notification for a calendar event generated from a calendar application on first user device 120. In an example, the user profile includes an email account, and the first and second user devices have an email client application configured to the email account. Management server 110 receives an indication of a new email sent to the address associated with the email account. The new email may originate from an email exchange server, as an example.

At stage 416, management server 110 can place the notification in a queue. In an example, the queue can include all notifications for the user profile that have not been delivered to all user devices associated with the user profile. The queue can also include information about which devices have confirmed receipt of the notification. Once all user devices associated with the user profile have provided a receipt confirmation, the notification can be cleared from the queue.

At stage 418, management server 110 can sync the notification queue. Syncing the notification queue can include compiling and distributing all necessary data related to notifications in the queue, including adding new notifications, updating a notification with receipt confirmations, and clearing notifications that have a receipt confirmation for all user devices associated with the user profile. In an example, portal application 122 on the user devices can communicate with each other and management server 110 to manage the notification queue. The notification queue can be configured to remove notifications from the queue after a predetermined amount of time regardless of whether all the user devices have provided a receipt confirmation. For example, a calendar event notification may expire after the calendar event has completed because the information provided in the notification has become obsolete.

At stage 420, first user device 120 can determine that second user device 130 did not receive the notification. For example, after a sync, first user device 120 can determine that second user device 130 did not provide a receipt confirmation of a notification in the notification queue. The sync can also indicate to all online devices which devices were unable to sync. For example, if the second device is offline and fails to sync with first user device 120 and management server 110, then first user device 120 is notified that second user device 130 is offline and cannot receive notifications. This stage can also include determining that second user device 130 is offline and therefore unable to receive a notification from a different source, such as a notification server.

At stage 422, first user device 120 can initiate a direct connection with second user device 130. In an example, second user device 130 can be configured to accept connection requests from certain other devices, such as a user device with the communication certificate. Portal application 122 can provide such a configuration, as an example. Portal application 122 can provide functionality that causes second user device 130 to be discoverable to other user devices with a similar portal application 122 that possess the communication certificate. For example, portal application 122 can cause second user device 130 to be discoverable via BLUETOOTH or a hidden WIFI SSID known to other user devices with the communication certificate. In some examples, portal application 122 makes a device discoverable to other devices without the communication certificate, but a connection between those devices can require the certificates.

At stage 424, first user device 120 can verify that second user device 130 possesses the communication certificate. The communication certificate can be specific to the user profile. Verifying the communication certificate can include comparing second user device 130's communication certificate to that of first user device 120 to ensure that they match. In some examples, second user device 130 can encrypt the communication certificate for security reasons. For example, second user device 130 can use a security key to encrypt the communication certificate. In some examples, second user device 130 can provide a hash function of the communication certificate, such as a cryptographic hash function. First user device 120 can use a hash value to decipher the hash function provided by second user device 130 and compare it to the communication certificate stored on first user device 120. A match indicates to first user device 120 that second user device 130 possesses the communication certificate and is authorized to receive the notification.

First user device 120 can also verify that second user device 130's communication certificate is not expired or invalid. A current and valid communication certificate can indicate to first user device 120 that second user device 130 is authorized to receive the notification. Sometimes notifications contain sensitive information, and verifying the communication certificate can help prevent such information from being sent to a user who should not have access to such information.

At stage 426, after verifying that second user device 130 possesses the communication certificate, first user device 120 can send the notification to second user device 130. In an example, first user device 120 can encrypt the notification to provide additional security. The communication certificate can allow second user device 130 to decrypt the notification, such as by using the communication certificate or a different private key shared across devices for decryption. At stage 428, second user device 130 can send a notification receipt confirmation to the first device. A notification receipt confirmation can simply be a message informing first user device 120 that second user device 130 received the notification. In some examples, second user device 130 sends the notification receipt confirmation to both first user device 120 and management server 110 together.

At stage 430, first user device 120 can remove the notification from the notification queue. This can be done in response to second user device 130 providing the notification receipt confirmation. In examples that include more than two user devices, first user device 120 can determine that all other user devices have also provided a notification receipt confirmation before removing the notification from the queue.

At stage 432, management server 110 and first user device 120 can sync the notification queue again. Doing so can remove the notification from the queue on all synced devices. In some examples that include more than two user devices, another device aside from second user device 130 may not have received the notification. In such examples, the device sync can update the notification queue with the confirmation receipt of the second device, but the notification can remain in the queue until all user devices provide a notification receipt confirmation or the notification expires. In one example, first user device 120 can repeat stages 420-428 for a third user device that is also offline, such as third user device 140.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for peer-to-peer ("P2P") notification exchange, comprising:
receiving, at a first user device, a communication certificate associated with a user of the first user device;
receiving a notification at the first user device;
initiating a direct connection with a second user device associated with the user;
verifying, by the first user device, based on the communication certificate, that the second user device is authorized to receive the notification; and
transmitting the notification to the second user device.

2. The method of claim 1, further comprising determining that the second user device has not received the notification prior to transmitting the notification.

3. The method of claim 1, wherein verifying that the second user device is authorized to receive the notification comprises confirming that the second user device is in possession of the communication certificate.

4. The method of claim 1, further comprising:
prior to transmitting the notification, placing the notification in a queue;
receiving a confirmation from the device that the notification was received; and
in an instance in which confirmation is received, removing the notification from the queue.

5. The method of claim 4, further comprising syncing the queue with a third user device.

6. The method of claim 5, further comprising verifying, based on the third user device being in possession of the communication certificate, that the third user device is authorized to sync the queue.

7. The method of claim 1, wherein the direct connection is established using WI-FI or BLUETOOTH.

8. A non-transitory, computer-readable medium containing instructions that, when executed by a hardware-based processor, performs stages for peer-to-peer ("P2P") notification exchange, the stages comprising:
receiving, at a first user device, a communication certificate associated with a user of the first user device;
receiving a notification at the first user device;
initiating a direct connection with a second user device associated with the user;
verifying, based on the communication certificate, that the second user device is authorized to receive the notification;
determining that the second user device is offline; and
transmitting the notification from the first user device to the second user device while the second user device remains offline.

9. The non-transitory, computer-readable medium of claim 8, the stages further comprising determining that the second user device has not received the notification prior to transmitting the notification.

10. The non-transitory, computer-readable medium of claim 8, wherein verifying that the second user device is authorized to receive the notification comprises confirming that the second user device is in possession of the communication certificate.

11. The non-transitory, computer-readable medium of claim 8, the stages further comprising:
prior to transmitting the notification, placing the notification in a queue;
receiving a confirmation from the device that the notification was received; and
in an instance in which confirmation is received, removing the notification from the queue.

12. The non-transitory, computer-readable medium of claim 11, the stages further comprising syncing the queue with a third user device.

13. The non-transitory, computer-readable medium of claim 12, the stages further comprising verifying, based on the third user device being in possession of the communication certificate, that the third user device is authorized to sync the queue.

14. The non-transitory, computer-readable medium of claim 8, wherein the direct connection is established using WI-FI or BLUETOOTH.

15. A system for peer-to-peer ("P2P") notification exchange, comprising:
a memory storage including a non-transitory, computer-readable medium comprising instructions; and
a computing device including a hardware-based processor that executes the instructions to carry out stages comprising:
receiving, at a first user device, a communication certificate associated with a user of the first user device;
receiving a notification at the first user device;
initiating a direct connection with a second user device associated with the user;
verifying, by the first user device, based on the communication certificate, that the second user device is authorized to receive the notification; and
transmitting the notification to the second user device.

16. The system of claim 15, the stages further comprising determining that the second user device has not received the notification prior to transmitting the notification.

17. The system of claim 15, wherein verifying that the second user device is authorized to receive the notification comprises confirming that the second user device is in possession of the communication certificate.

18. The system of claim 15, the stages further comprising:
prior to transmitting the notification, placing the notification in a queue;
receiving a confirmation from the device that the notification was received; and
in an instance in which confirmation is received, removing the notification from the queue.

19. The system of claim 18, the stages further comprising syncing the queue with a third user device.

20. The system of claim 19, the stages further comprising verifying, based on the third user device being in possession of the communication certificate, that the third user device is authorized to sync the queue.

* * * * *